US008299906B2

(12) United States Patent
Schultz et al.

(10) Patent No.: US 8,299,906 B2
(45) Date of Patent: Oct. 30, 2012

(54) VIBRATION DEVICE

(75) Inventors: Jonathan Paul Schultz, Hong Kong (HK); Chris John Hindle, Derbyshire (GB); Keith Adrian Gough, Hong Kong (HK)

(73) Assignee: Think Love LLC, Hicksville, NY (US)

( * ) Notice: Subject to any disclaimer, the term of this patent is extended or adjusted under 35 U.S.C. 154(b) by 433 days.

(21) Appl. No.: 12/539,621

(22) Filed: Aug. 12, 2009

(65) Prior Publication Data

US 2011/0037345 A1 Feb. 17, 2011

(51) Int. Cl.
*H04B 3/36* (2006.01)

(52) U.S. Cl. .................. 340/407.1; 340/407.2; 340/500

(58) Field of Classification Search ................ 340/407.1
See application file for complete search history.

(56) References Cited

U.S. PATENT DOCUMENTS 7,085,197 B1 * 8/2006 Pehrson ........................ 368/109
7,199,700 B1 * 4/2007 McPherson et al. ....... 340/407.1
2009/0318753 A1 * 12/2009 Metri ............................. 600/38

* cited by examiner

*Primary Examiner* — Kerri McNally

(57) ABSTRACT

The present utility model provides a vibration device, comprising: an case which is equipped with an light sensing lens, and oscillator, battery, photonic circuit, CPU, time quartz crystal and central processing circuit board mounted inside the cavity of the case, wherein the photonic circuit and CPU are configured on the central processing circuit board. The present utility model provides a vibration device which vibrates at given time together with one or several same type of products for reminding your lovers/friends something at given time. This device with small volume can be equipped on the device in the form of a watch, key ring or waistband, which makes it portable.

3 Claims, 3 Drawing Sheets

VIBRATION DEVICE

FIELD OF TECHNOLOGY

The present utility model relates to the field of electronic technology, and more especially, to a vibration device.

BACKGROUND OF THE TECHNOLOGY

With the rapid development of technology, various electronic products have come forth in people's daily life; in particular, people expect that electronic products provide more functions such as reminding and mutual indication which may bring about more enjoyment for life. However, such products do not exist among the existing technologies.

SUMMARY OF THE UTILITY MODEL

The present utility model provides a vibration device that vibrates with one or several same type of products at a given time for reminding your lovers or friends something at given time.

To realize the purpose mentioned above, the present utility model provides the following technical solution:

A vibration device, comprising: an case which is equipped with alight sensing lens, and oscillator, battery, photonic circuit, CPU, time quartz crystal and central processing circuit board mounted inside the cavity of the case, the photonic circuit and CPU are configured on the central processing circuit board, wherein:

The time quartz crystal and photonic circuit are connected with the CPU respectively, and the light sensing lens is connected with the photonic circuit, the time quartz crystal signal is connected with the oscillator, the battery supplies power for the central processing circuit board and oscillator;

The light sensing lens is used to collect the light signals on the initial web page of the manufacturer and then send them to the photonic circuit;

The photonic circuit is used to receive the light signals from the light sensing lens, convert the light signals into timing signals and then send out the timing signals to the CPU;

The CPU is used to receive and store the timing signals, and control the time quartz crystal to enable the oscillator to vibrate according to the timing signals.

Wherein, the case is fully sealed.

Wherein, a button controlling the startup of the vibration device is set on the upper cover of the case, the button signal is connected with the CPU.

The present utility model provides a vibration device which vibrates at a given time together with one or several same type of products for reminding your lovers or friends something at given time. This device with small volume can be equipped on the device in the form of a watch, key ring or waistband, which makes it portable.

DETAILED DESCRIPTION OF THE EMBODIMENT

To have a better understanding of the technical solution of the present utility model, the embodiment provided by the present utility model is detailed in combination with the drawings hereinafter.

Figure 1:
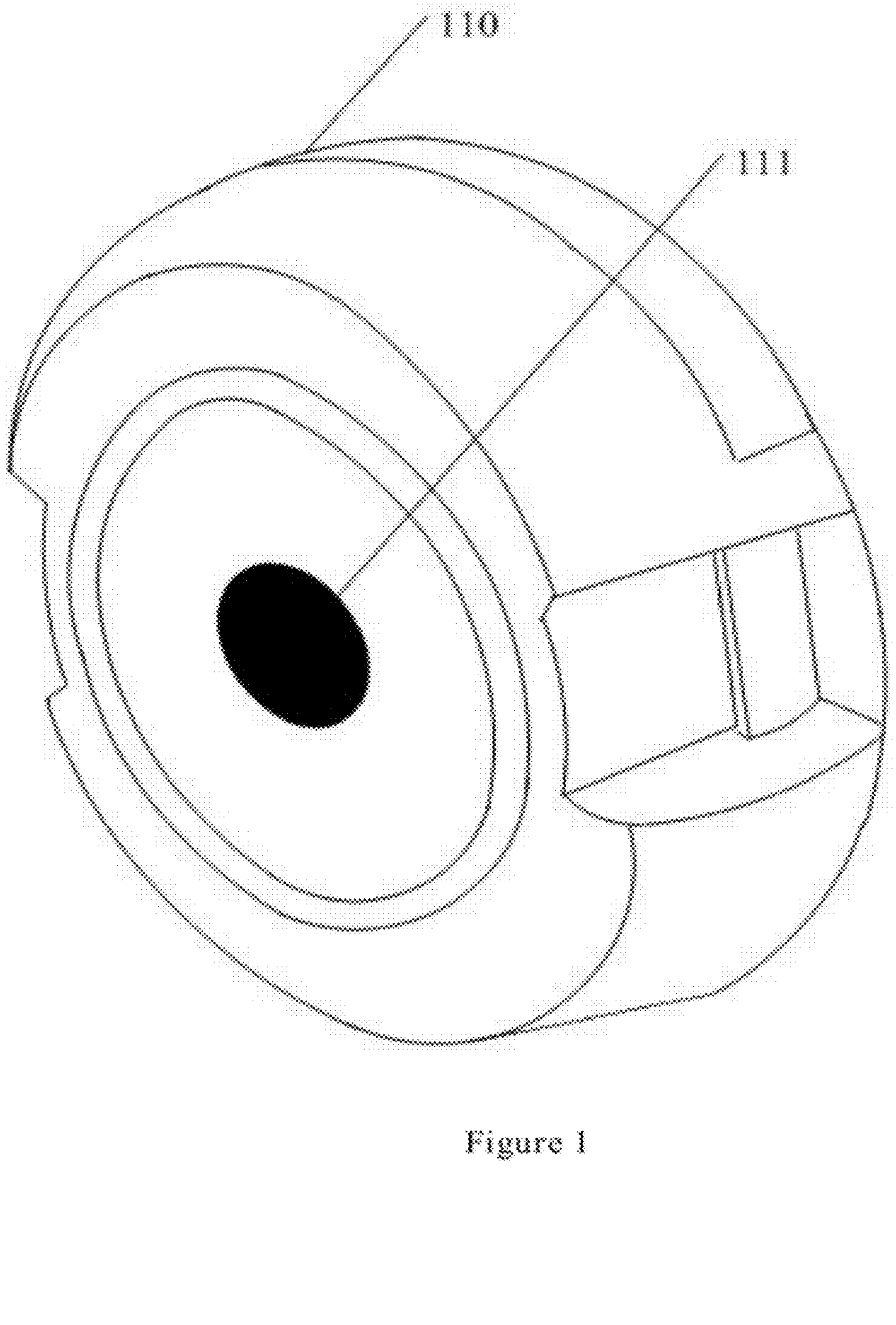
FIG. 1 is the front view of the external structure for the vibration device provided by the embodiment of the present utility model.
Figure 2:
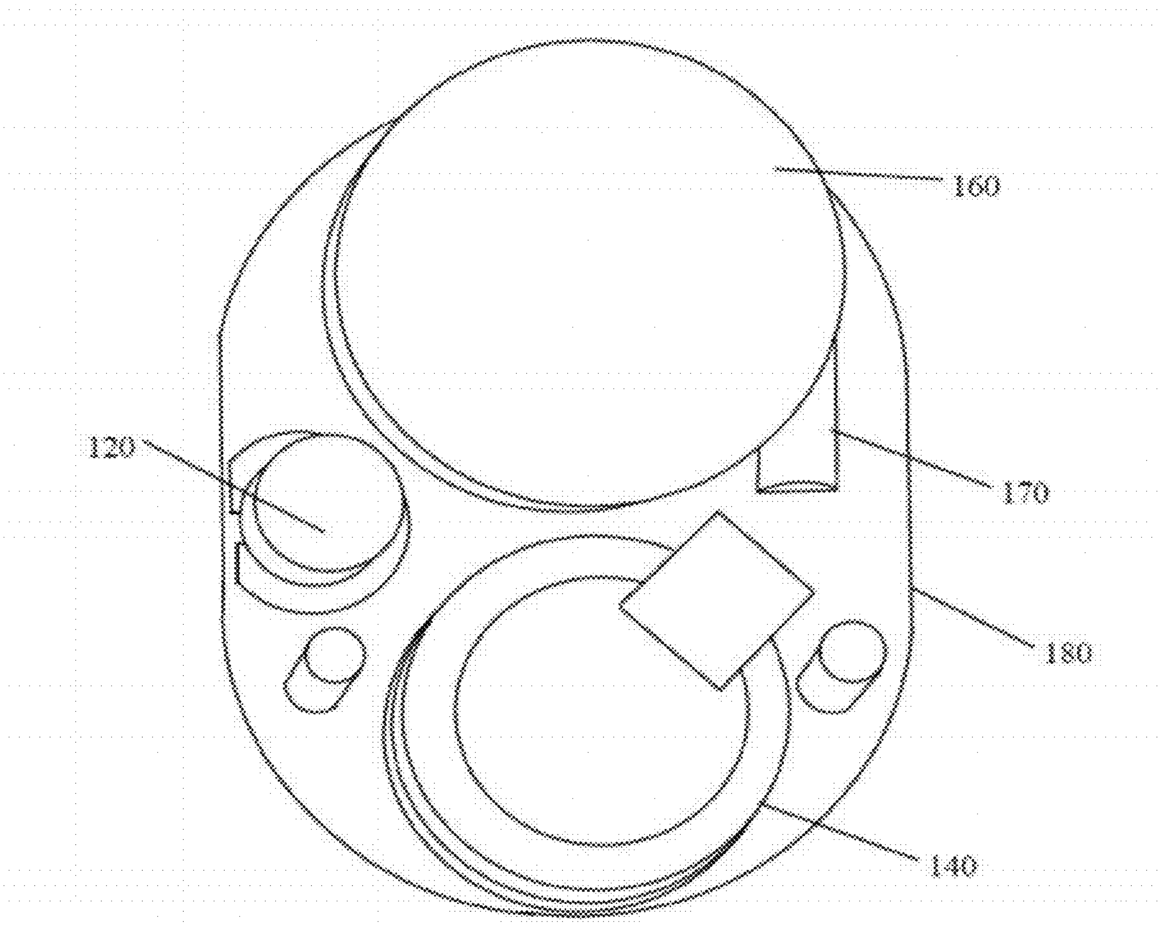
FIG. 2 is the view of the internal structure for the vibration device provided by the embodiment of the present utility model.
Figure 3:
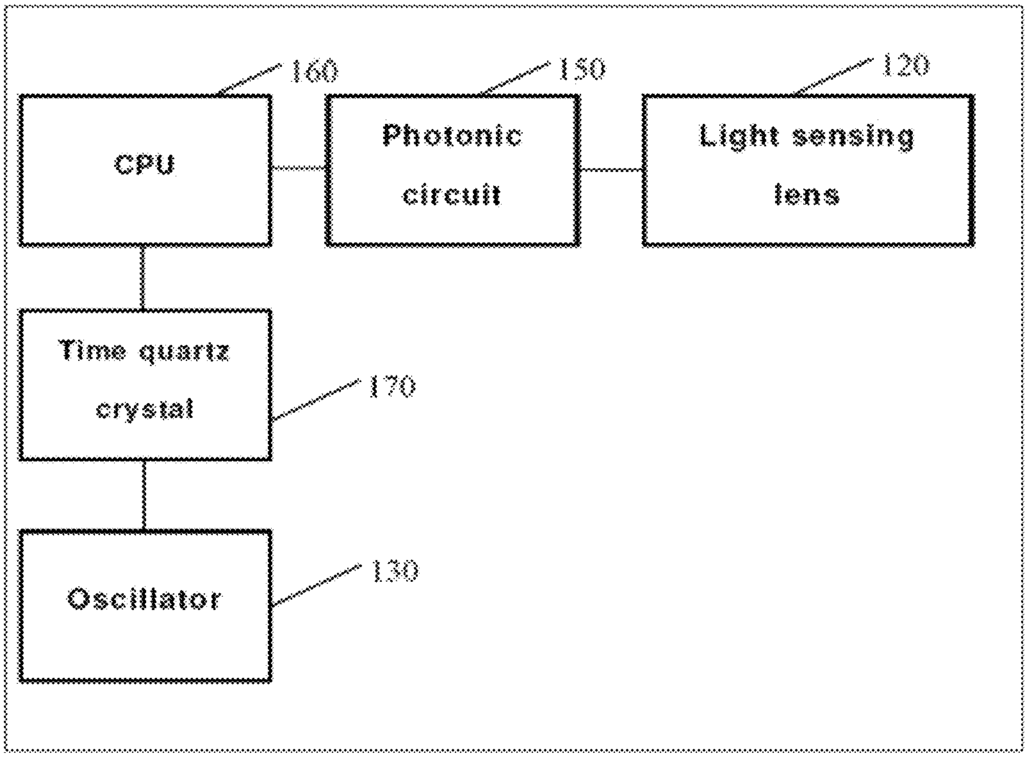
FIG. 3 is the electric schematic diagram for the vibration device provided by the embodiment of the present utility model.

The present utility model provides a vibration device, as shown in FIG. 1, 2 and 3, comprising: an case 110 which is formed by a round upper cover and a round lower cover in snap-on and sealing mode, wherein the light sensing lens 120 is a round lens and set behind the side of the lower cover of the case 110. Oscillator 130, battery 140, photonic circuit 150 (photonic circuit comes forth in the existing technology), CPU 160, time quartz crystal 170 and central processing circuit board 180 are mounted inside the cavity of the case 110. The photonic circuit 150 and CPU 160 are fixed on the central processing circuit board 180, wherein:

The time quartz crystal 170 and photonic circuit 150 are signal-connected with the CPU 160 respectively, the signal of the light sensing lens 120 is connected with the photonic circuit 150, the time quartz crystal 170 signal is connected with the oscillator 130, the battery 140 supplies power for the central processing circuit board 180 and oscillator 130;

The light sensing lens 120 is used to collect the light signals on the initial web page of the manufacturer and then send them to the photonic circuit 150;

The photonic circuit 150 is used to receive the light signals from the light sensing lens 120, convert the light signals into timing signals and then send out the timing signals to the CPU 160;

The CPU 160 is used to receive and store the timing signals, and control the time quartz crystal 170 to enable the oscillator 130 to vibrate according to the timing signals.

Wherein, the case 110 is fully sealed in this embodiment.

Wherein, in this embodiment, a button 111 controlling the startup of the vibration device is set on the upper cover of the case, the button signal is connected with the CPU 160.

The present utility model provides a vibration device that vibrates at a given time together with one or several same type of products for reminding your lovers/friends something at given time. This device with small volume can be equipped on the device in the form of a watch, key ring or waistband, which makes it portable.

The usage of the vibration device is as below:

When two or more users invest in the vibration device for concurrent use, they shall enter the initial web page of the manufacturer first, the web page then emits an irregular light. The users shall enable one side of the light sensing lens 120 for the device to face the web page respectively. Afterwards, press the initial button 111, then the light sensing lens 120 will sense the light signals on the web page and enable the photonic circuit 150 to convert the light signals to timing signals, and enable the CPU 160 to store them. The CPU 160 enables the oscillator 130 to vibrate in cooperation with the time quartz crystal 170.

The vibration device provided by the embodiment of the present utility model is described in detail above. As to the technical personnel, according to the concept of the embodiment of the present utility model, the embodiment and application scope may vary to some extent. In conclusion, the contents of the specification shall not be considered as the limitation to the present utility model.

What is claimed is:

1. A vibration device comprising a case which is equipped with a light sensing lens, and oscillator, battery, photonic circuit, CPU, time quartz crystal and central processing circuit board mounted inside the cavity of the case, the photonic circuit and CPU are configured on the central processing circuit board, wherein:

the time quartz crystal and photonic circuit are signal-connected with the CPU respectively; the light sensing lens directs incoming photons to the photonic circuit; the time quartz crystal and the oscillator are signal-connected; the battery supplies power for the central processing circuit board and oscillator;

the light sensing lens is used to collect light signals on the initial web page of the manufacturer and then send them to the photonic circuit;

the photonic circuit is used to receive the light signals from the light sensing lens, convert the light signals into timing signals and then send out the timing signals to the CPU;

the CPU is used to receive and store the timing signals, and control the time quartz crystal to enable the oscillator to vibrate according to the timing signals.

2. The vibration device according to claim 1, is characterized in that the case is fully sealed.

3. The vibration device according to claim 1, characterized in that a button controlling the startup of the vibration device is set on the upper cover of the case, wherein the button is part of a circuit connected to the CPU, the CPU registering the duration of button presses.

* * * * *